United States Patent [19]

Baird, Jr. et al.

[11] Patent Number: 4,963,249
[45] Date of Patent: Oct. 16, 1990

[54] REFORMING USING NOVEL PLATINUM-TIN ALUMINA CATALYSTS

[75] Inventors: William C. Baird, Jr.; Kenneth L. Riley; George A. Swan, III, all of Baton Rouge, La.

[73] Assignee: Exxon Research & Engineering Company, Florham Park, N.J.

[21] Appl. No.: 375,570

[22] Filed: Jul. 3, 1989

[51] Int. Cl.$^5$ .......................................... C10G 35/085
[52] U.S. Cl. .................................... 208/139; 208/138
[58] Field of Search .............................. 208/138, 139

[56] References Cited

U.S. PATENT DOCUMENTS

| | | | |
|---|---|---|---|
| 4,042,490 | 8/1977 | Suggitt et al. | 585/733 |
| 4,165,276 | 8/1979 | Antos | 585/751 |
| 4,480,048 | 10/1984 | Bournonville et al. | 208/139 |
| 4,645,588 | 2/1987 | Buss et al. | 208/138 |

Primary Examiner—Curtis R. Davis
Attorney, Agent, or Firm—Henry E. Naylor

[57] ABSTRACT

A process for reforming gasoline boiling range naphthas which process comprises use of catalysts comprised of Pt and Sn on alumina and a modifier comprised of at least about 100 wppm Si and at least 10 wppm of one or more alkaline earth metals selected from Ca, Mg, Ba, and Sr wherein the total amount of modifier does not exceed about 5000 wppm.

8 Claims, 2 Drawing Sheets

REFORMING USING NOVEL PLATINUM-TIN ALUMINA CATALYSTS

FIELD OF THE INVENTION

The present invention relates to a process for reforming naphtha and straight run gasoline feeds by reacting said feed with a novel platinum-tin-alumina catalyst which contains a modifier component comprised of at least about 100 wppm of Si and at least about 10 wppm of one or more alkaline earth metals selected from Ca, Mg, Ba, and Sr, wherein the total amount of modifer does not exceed about 5000 wppm.

BACKGROUND OF THE INVENTION

Catalytic reforming, or hydroforming, is a well established industrial process employed by the petroleum industry for improving the octane quality of naphthas and straight run gasolines. In fact, it is the primary source of octane in the modern refinery. Reforming can be defined as the total effect of the molecular changes, or hydrocarbon reactions, produced by dehydrogenation of cyclohexanes and dehydroisomerization of alkylcyclopentanes to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst. In catalytic reforming, a multi-functional catalyst is employed which contains a metal hydrogenation-dehydrogenation (hydrogen transfer) component, or components, usually platinum, substantially atomically dispersed upon the surface of a porous, inorganic oxide support, such as alumina. The alumina support, which usually contains a halide, particularly chloride, provides the acid functionality needed for isomerization, cyclization, and hydrocracking reactions.

Reforming reactions are both endothermic and exothermic, the former being predominant, particularly in the early stages of reforming with the latter being predominant in the latter stages. In view thereof, it has become the practice to employ a reforming unit comprised of a plurality of serially connected reactors with provision for heating of the reaction stream from one reactor to another. There are three major types of reforming: semiregenerative, cyclic, and continuous. Fixed-bed reactors are usually employed in semiregenerative and cyclic reforming and moving-bed reactors in continuous reforming. In semiregenerative reforming, the entire reforming process unit is operated by gradually and progressively increasing the temperature to compensate for deactivation of the catalyst caused by coke deposition, until finally the entire unit is shut-down for regeneration and reactivation of the catalyst. In cyclic reforming, the reactors are individually isolated, or in effect swung out of line, by various piping arrangements. The catalyst is regenerated by removing coke deposits, and then reactivated while the other reactors of the series remain on stream. The "swing reactor" temporarily replaces a reactor which is removed from the series for regeneration and reactivation of the catalyst, which is then put back in the series. In continuous reforming, the reactors are moving-bed reactors, as opposed to fixed-bed reactors, with continuous addition and withdrawal of catalyst, and the catalyst is regenerated in a separate regeneration vessel.

In an era of limited and expensive feedstocks, the demand for additional aromatics (octane) must be satisfied while maximizing both liquid and aromatic yields. For this reason, catalysts offering higher selectivity to liquid products will replace those of lower selectivity. Activity remains an equally important catalytic parameter and must be retained at a level equal to, or ideally greater than, that of current commercial technology. It is recognized in the art that one of the keys to selectivity control is the suppression of cracking reactions occurring over both the metal and acid sites of bifunctional reforming catalysts. Acid cracking reactions lead primarily to propane and isobutane and to higher isoparaffins, which are more difficult to aromatize and hence more prone to both metal and acid site cracking. While a certain level of catalyst acidity is required to initiate certain essential isomerization reactions, overly active acidity leads to both yield loss and deactivation. Specific steps to moderate, or control, acid cracking reactions in catalytic reforming are not common in the art. Elimination of these cracking reactions is desirable for two reasons: first the light $C_1$–$C_4$ gases produced are of lesser value than reformate; and second, activity and liquid yield are tied to the retention and aromatization of feed paraffins.

Sulfur is sometimes used to modify reforming catalyst selectivity by principally suppressing methane formation. While sulfur is effective for this purpose, its use introduces process complication, which could be avoided if catalyst sulfiding were not essential. Furthermore, certain non-reforming active metals have been shown to decrease metal site cracking reactions, principally of the internal type yielding $C_3$ and $C_4$ hydrocarbons. Examples of such metals include copper, gold, silver, and tin. Since these metals are normally used in conjunction with sulfur, a universal decline in all light gas products results.

While much work has been done over the years in developing improved reforming catalysts, it has generally focused on such things as concentration and combination of catalytically active metals, and type and pore size distribution of the support material. Other work has resulted in the modification of support materials by introducing a catalytically effective amount of an alkali or alkaline earth metal composite into the support. See for example, U.S. Pat. Nos. 2,602,771; 2,930,763 and 3,714,281.

Although commercially, successful catalysts have resulted from such work, there still exists a need in the art for further improvement, especially with regard to both catalyst activity and selectivity. In accordance with the present invention, a new approach is described wherein reformate yield is improved with simultaneous suppression of both metal and acid site cracking through the use of a novel support material which universally decreases all cracking reactions. While catalyst activity, as measured by conversion, decreases as a consequence of decreased cracking, aromatization activity and aromatics selectivity essential to catalytic reforming are retained and improved. Furthermore, the support materials of the present invention permit catalysts supported on the material to be operated in an unsulfided state.

SUMMARY OF THE INVENTION

In accordance with the present invention, there is provided a process for reforming naphthas, which process comprises reforming said naphthas with a catalyst comprised of about 0.01 to 2 wt. % Pt; 0.01 to 2 wt. %

Sn; alumina; and a modifier comprised of at least about 100 wppm of Si and at least about 10 wppm of one or more alkaline earth metals selected from Ca, Mg, Ba, and Sr, wherein the total amount of modifier does not exceed about 5000 wppm.

In a preferred embodiment of the present invention, the alumina is gamma alumina and the concentration of Pt and Sn is about 0.1 to 0.7 wt. % each.

In another preferred embodiment, other active metals such as iridium or rhenium are present up to a concentration of 2 wt. %.

In other preferred embodiments of the present invention the modifier is comprised of about 100 to 200 wppm of Si and about 100 to 3000 wppm of an alkaline earth metal is selected from Mg and Ca.

DETAILED DESCRIPTION OF THE INVENTION

Figure 1:
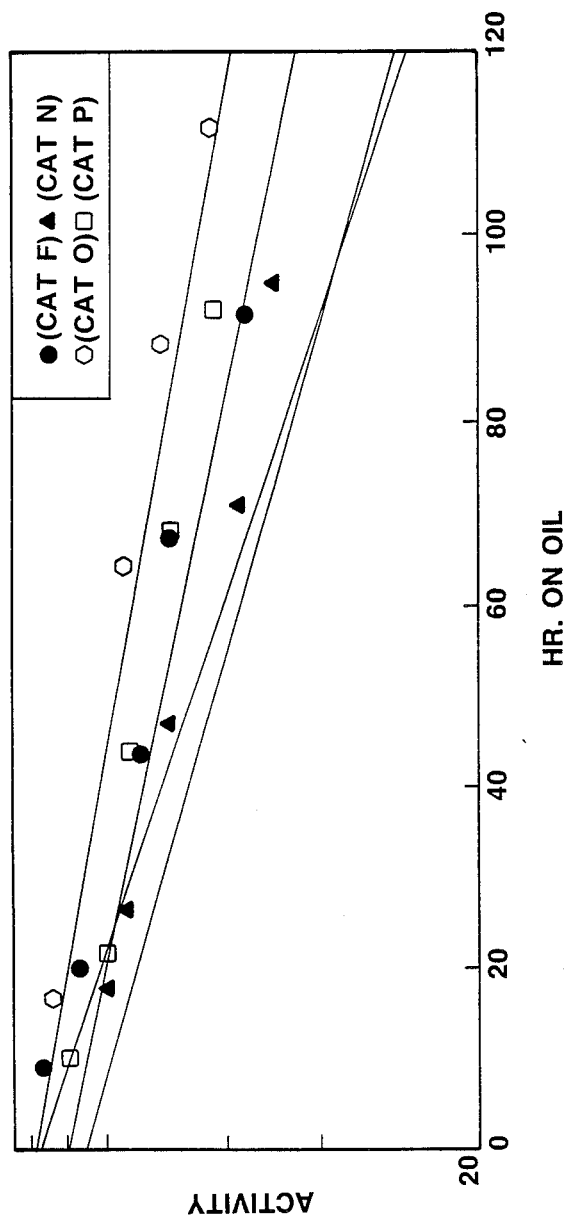
FIG. 1 is plot of data of Table II hereof which shows activity as a function of time for heptane reforming of Catalysts F, O, N, and P.

Aluminas suitable for modification in accordance with the present invention are any of the high purity aluminas suitable for use as a support for reforming catalysts. The term, high purity alumina, means an alumina which is at least 99% pure, preferably at least 99.5% pure, and more preferably at least 99.9% pure. The alumina can be synthetic or naturally occurring, although synthetic alumina is preferred because its preparation can be controlled to insure the appropriate level of purity and desired physical characteristics. It is also preferred that the alumina be one which upon calcination forms gamma alumina. By "an alumina which upon calcination forms gamma alumina" it is meant an alumina which is essentially in the trihydrate form prior to calcination, and which upon calcination is, according to the crystal pattern, gamma alumina. Principally, these aluminas are derived from precipitation methods or, preferably, the digestion of metallic aluminum by a weak organic acid.

In a preferred precipitation method, the alumina is prepared by the addition of an acid or acid salt such as hydrochloric acid or any of the alums, to an alkali metal aluminate, such as sodium or potassium aluminate.

The most preferred aluminas suitable for use herein are those prepared by digesting, or reacting, metallic aluminum with a weak organic acid to form an alumina sol. Preferred weak organic acids include acetic and formic acid. It is also preferred that the aluminum be digested in the presence of a mercury compound, such as a mercury aluminum hydroxide complex of acetic acid. Such processes are well known to those skilled in the art and are described in U.S. Pat. Nos. as 2,274,634; Re 22,196 and 2,859,183; all of which are incorporated herein by reference. As previously mentioned, in such a process, an alpha aluminum salt is prepared by dissolving metallic aluminum in a dilute (about 1-6 wt. %) organic acid in the presence of a mercury compound. The aluminum and mercury form an amalgam which slowly dissolves with the evolution of hydrogen to alumina salt containing mercury, undissolved aluminum, and other materials. If desired, the resulting sol can be treated with a sufficient amount of ammonium hydroxide to obtain a pH of about 6.8 to 7.8, to form a gel which can be dried and calcined. It is preferred that the sol not be gelled, but that it be sprayed-dried to produce a high purity alumina hydrate powder, which can then be ground to an appropriate particle size. Although not critical for the practice of the present invention, an appropriate particle size is from about 5 to 15 microns.

The modified aluminas of the present invention are prepared by incorporating therein an effective amount of modifier. The modifier is such that when used in an effective amount it contributes to the resulting reforming catalyst having improved overall selectivity with respect to liquid yield with simultaneous suppression of both metal and acid site cracking, when compared to a similar catalyst not containing such modifiers. By the term "effective amount of modifier" is meant that concentration range of modifier which will improve the selectivity and reduce the cracking tendencies of the resulting catalysts when used in reforming. Generally, the modifier component of the present invention is comprised of at least about 100 wppm Si and at least about 10 wppm of one or more alkaline earth metals selected from Ca, Mg, Ba, and Sr, provided the total amount of modifier does not exceed about 5000 ppm. Preferred is about 100 to 200 wppm Si and about 100 to 3000 wppm of an alkaline earth metal. More preferred is about 100 to 200 wppm Si and about 200 to 1000 wppm of one or both of Ca and Mg. Most preferred is when the alkaline earth metal is Mg.

As previously mentioned herein, the modifiers of this invention are comprised of Si plus one or more alkaline earth metals selected from Ca, Mg, Ba, and Sr. Preferred is Si with Ca, Mg, or both, particularly the halides, nitrates, nitrites, oxides, hydroxides, and carbonates. It is preferred that Si be introduced as a compound of Si which will form a stable aqueous solution, or stable emulsion, in aqueous media. Organic derivatives of Si and Si-polymers, such as silicon oils, are examples of preferred Si compounds.

The modifier component can be incorporated into the alumina during any stage of alumina hydrate, alumina, or catalyst production. In a particularly preferred production scheme for producing the modified alumina of this invention, high purity alumina hydrate powder is first prepared by digesting metallic aluminum in a weak organic acid, thereby forming an alumina sol which is then spray-dried by a conventional spray-drying technique to produce the alumina hydrate powder. If the alumina hydrate powder is not of appropriate particle size, it can be ground by any conventional grinding means for reducing the particle size of refractory powders. The alumina hydrate powder is then blended with an effective amount of water, or sol, to form a paste of sufficient consistency for extrusion. The alumina paste is then extruded into an appropriate shape, such as pellets, dried and calcined at temperatures from about 400° C. to about 650° C. Active metals can then be impregnated into the alumina by conventional impregnation means to form the reforming catalyst. Non-limiting examples of suitable active metals include platinum, rhenium, iridium, tin, copper, and mixtures thereof. It is understood that modern reforming catalysts universally include platinum as one of the active metals, with or without one or more other active metals.

The modifier component can be introduced in any one or more of the above process steps. For example, during preparation of the alumina powder, the modifier component, in the form of a water soluble salt, can be blended with the alumina sol prior to spray-drying. It can also be blended with the alumina hydrate powder, which blend can then be further blended with the alumina sol to form the extrusion paste. Further, the alumina hydrate powder and alumina sol can first be blended whereupon the modifier component can be added with sufficient water to form an extrudable paste. It is also understood that the modifier component can be mixed with the alumina powder prior to grinding. Although the modifier component can concurrently be incorporated into the alumina hydrate material after extrusion by conventional impregnation techniques, it is preferred to introduce the modifier component prior to extrusion to ensure homogeneity of the modifier elements throughout the alumina material.

The modified alumina materials of this invention are characterized as: (i) having a concentration of modifier component ranging from about 10 to about 5000 wppm; (ii) a surface area greater than about 50 m$^2$/g, preferably from about 100 to 700 m$^2$/g, and more preferably from about 100 to 300 m$^2$/g; (iii) a bulk density from about 0.3 to 1 g/ml, preferably from about 0.4 to 0.8 g/ml; (iv) an average pore volume from about 0.2 to 1.1 ml/g, preferably from about 0.3 to 0.8 ml/g; and (v) an average pore diameter from about 30 to 300 Angstroms.

A unique feature of the modified aluminas of the present invention are their attenuated acidic character relative to conventional, reforming grade aluminas, such as high purity gamma alumina. While these differing acidities may be assessed by various analytical procedures, one of the most definitive procedures is the chemistry of the catalytic reforming process as it is in this environment where the influence of the alumina acid function is observed. In this sense, heptane reforming serves as a model system for observing and quantifying the role of the support acidity on reforming selectivity and activity. While various metal site and acid site cracking reactions occur giving rise to different sets of reaction products from heptane, only cracking to isobutane is exclusively diagnostic of acid cracking activity. For this reason, changes in the isobutane yield in heptane reforming reflect changes in the acid character of the catalyst, and this product yield in itself can distinguish among catalysts with differing acid strengths and product selectivities. Furthermore, this measure is further refined by comparison of the toluene/isobutane ratios for various catalysts, for this value invariably increases as toluene and $C_{5+}$ selectivity increase as isobutane yield decreases. While the toluene/isobutane ratio is most valid for comparison of the same metal, or metals, supported on aluminas of varying acidity, the generalization can be made that for heptane reforming, the catalysts supported on the modified alumina of this invention result in at least about 10 wt. % less isobutane yield, preferably at least about 20 wt. % less isobutane yield; and at least about 5% greater toluene to isobutane ratio, preferably at least about 10% toluene to isobutane ratio, when compared with the identical catalyst on conventional high purity gamma alumina.

Reforming catalysts are prepared from the modified aluminas of the present invention by incorporating therein at least one metal capable of providing a hydrogenation-dehydrogenation function. The resulting catalysts will also contain a cracking function which is important for isomerization reactions and which is associated with the modified alumina support material. The hydrogenation-dehydrogenation function is preferably provided by at least one Group VIII noble metal, preferably platinum. Preferably, the platinum group metal will be present on the catalyst in an amount from about 0.01 to about 2 wt. %, calculated on an elemental basis, of the final catalyst composition. More preferably, the catalyst contains from about 0.01 to about 0.7 wt. % platinum, most preferably about 0.3 to 0.6 wt. % platinum. The catalyst of the present invention will also contain Sn at a concentration from about 0.01 to 2 wt. %, preferably about 0.1 to 0.7 wt. %, and most preferably about 0.3 to 0.6 wt. %. Iridium or rhenium may also be present in a concentration range from about 0.01 to 2 wt. %, preferably from about 0.01 to 0.7 wt. %, more preferably from about 0.3 to 0.6 wt. %.

The metals can be incorporated onto the alumina by technique such as by impregnation on the modified alumina either before or after it has been pilled, pelleted, beaded, or extruded. It is preferred to incorporate the metals, especially tin, into the alumina prior to extrusion. This is accomplished by adding tin and one or more of the other metals directly to the mull mix prior to extrusion. If impregnation is used, the modified alumina, in a dry, or solvated state, is contacted, either alone or admixed, or otherwise incorporated with platinum, or a platinum containing solution and thereby impregnated by either the "incipient wetness" technique, or a technique embodying absorption from a dilute or concentrated solution, with subsequent filtration or evaporation to effect the total uptake of the metallic components. The solution used in the impregnation step can be a salt or acid solution having the respective platinum compound dissolved therein. The amount of impregnation solution used should be sufficient to completely immerse the alumina. This is usually within the range of about 1 to 20 times the amount of alumina, by volume, depending on the platinum concentration in the impregnation solution. The impregnation treatment can be carried out under a wide range of conditions, including ambient or elevated temperatures, and atmospheric or superatmospheric pressures.

The catalyst may also contain a halide component which contributes to the acid functionality of the catalyst. The halide may be fluoride, chloride, iodide, bromide, or mixtures thereof. Preferred are fluoride and chloride, with chloride being more preferred. Generally, the amount of halide is such that the final catalyst composition will contain from about 0.1 to about 3.5 wt. %, preferably from about 0.5 to about 1.5 wt. %, of halogen calculated on an elemental basis. The halogen can be introduced into the catalyst by any method at any time of the catalyst preparation, for example, prior to, following or simultaneously with the impregnation of the platinum. In the usual operation, the halogen component is introduced simultaneously with the incorporation of platinum. Halogen can also be incorporated by contacting the modified alumina in a vapor phase, or liquid phase, with a halogen compound such as hydrogen fluoride, hydrogen chloride, ammonium chloride, or the like.

The catalyst, after impregnation, is dried by heating at a temperature above about 27° C., preferably between about 65° C. and 150° C., in the presence of nitrogen or oxygen, or both, in an air stream or under vacuum. It can then be calcined at a temperature from about 400° C. to 650° C., preferably from about 400° C. and 560° C., in the presence of nitrogen or oxygen in an air stream, or in the presence of a mixture of oxygen and an inert gas. This calcination or activation is conducted for periods ranging from about 1 to about 24 hours in either flowing or static gases. Reduction is performed by contact with flowing hydrogen at temperatures ranging from about 175° C. to about 560° C. for periods ranging from about 0.5 to about 24 hours at about 1–40 atm. The catalyst can be sulfided by use of a blend of $H_2S/H_2$ and performed at temperature ranging from about 175° C. to about 560° C. at about 1–40 atm. for a time necessary to achieve breakthrough, or until the desired sulfur level is reached. Post-sulfiding stripping can be employed, if desired, at conditions similar to those for reduction of the catalyst.

The feed, or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 27° C. to 235° C., and preferably from about 50° C. and 190° C., contain hydrocarbons of carbon numbers within these ranges. Typical fractions thus usually contain from about 20 to about 80 vol. % paraffins, both normal and branched, which fall in the range of about $C_5$ to $C_{12}$; from about 10 to 80 vol. % of naphthenes falling within the range of from about $C_6$ to $C_{12}$; and from 5 through 20 vol. % of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, Psig | 50–750 | 100–300 |
| Reactor Temp., °C. | 400–600 | 465–540 |
| Gas Rate, SCF/B (Incl. Recycle Gas) | 1500–10,000 | 2000–7000 |
| Feed Rate, W/Hr/W | 0.5–10 | 1–3 |

The instant invention is illustrated further by the following examples which, however, are not to be taken as limiting in any respect. All parts and percentages, unless expressly stated otherwise, are by weight.

Comparative Example A

A commercial Pt reforming catalyst (0.3 wt. % Pt. 0.9 wt. % Cl) on a high purity gamma alumina was calcined in air at 500° C. for 3 hrs., reduced at 500° C. for 17 hrs. in hydrogen, and sulfided at 500° C. This Pt catalyst, Catalyst A, was tested in heptane reforming with the results presented in Table I below.

Example 1

An alumina of this invention was used containing 200 wppm Na, 150 wppm Ca, 146 wppm Mg, 480 wppm Fe, and 500 wppm Si. Extrudates of this material (50 g.) were mixed with 75 ml. of water and placed in a fritted funnel whereupon carbon dioxide was passed through it for 30 minutes. To the mixture was added 5.4 ml. of chloroplatinic acid (28 mg Pt/ml.) and 4.8 ml. of hydrochloric acid (60 mg Cl/ml.) and carbon dioxide passed through it for 4 hours. The resulting catalyst was air dried, then vacuum dried at 110° C. for 4 hours. The catalyst was then calcined in air at a temperature of 500° C. for 3 hours, then reduced in hydrogen at 500° C. for 17 hours, then sulfided in a mixture of hydrogen sulfide and hydrogen at 500° C. until sulfur breakthrough. This catalyst is designated Catalyst B, and contains 0.3 wt. % Pt and 0.9 wt. % Cl., and was tested in heptane reforming with the results presented in Table I below.

Example 2

A preferred catalyst of this invention was prepared by the addition of Pt to an alumina modified by the addition of Mg and Si during its manufacture. In this case 500 ppm Mg and 500 ppm Si were added to the alumina mull mix preceding extrusion. The ingredients were thoroughly blended and mixed in the mull mixer, then passed to the extruder. The resultant extrudates were calcined at 600°–700° C. Pt was impregnated onto the Mg/Si modified alumina as in Example 1 above to provide a 0.3 wt. % Pt on modified alumina catalyst. The catalyst was also pretreated as in Example 1 and subjected to heptane reforming and is designated as Catalyst C in Table I below.

Comparative Example B

A commercial reforming catalyst containing 0.6 wt. % Pt and 0.9 wt. % Cl, on a high purity alumina support was calcined, reduced, and sulfided as in Example 1 above. This catalyst is designated Catalyst D, and was also tested in heptane reforming and the results presented in Table I below.

Example 3

The procedure of Example 1 was followed except the catalyst contained 0.6 wt. % Pt and 0.9 wt. % Cl. The catalyst of this example, which is comprised of the alumina of Example 1 hereof, is designated Catalyst E. Heptane reforming data was collected and the results are also shown in Table I below.

TABLE I

| Heptane Reforming With Pt Catalysts n-Heptane, 500° C., 100 psig, 10 W/H/W, $H_2$/Oil = 6 | | | | | |
|---|---|---|---|---|---|
| Catalyst | A | B | C | D | E |
| Yield, Wt. % | | | | | |
| $C_1$ | 1.2 | 0.9 | 1.1 | 1.6 | 1.0 |
| i-$C_4$ | 6.0 | 2.5 | 2.5 | 2.5 | 1.9 |
| n-$C_4$ | 5.1 | 3.4 | 3.7 | 4.7 | 3.3 |
| $C_5$+ | 76.4 | 86.6 | 86.1 | 82.5 | 87.9 |
| Toluene | 28.6 | 24.6 | 27.7 | 28.2 | 28.1 |
| Conversion, % | 64.5 | 48.1 | 55.5 | 62.4 | 49.5 |
| Toluene Rate | 2.9 | 2.5 | 2.9 | 3.3 | 2.9 |
| Toluene Selectivity | 43.9 | 50.4 | 49.6 | 50.7 | 56.3 |
| Toluene/i-$C_4$ | 4.8 | 9.8 | 11.1 | 11.3 | 14.8 |

Table I illustrates that Catalysts B and C, supported on modified aluminas of this invention, have a totally different selectivity pattern from conventional Catalyst A, which is on a high purity conventional gamma alumina. Acid cracking for the catalysts of this invention is greatly decreased as reflected in the isobutane yields. A secondary effect is a decrease in Pt hydrocracking reactions. The combined decrease in all cracking reactions leads to a 10 wt. % increase in the $C_5$+ yield with improved selectivity to toluene. The toluene/isobutane ratios for Catalyst A and B differ substantially, with it being higher for the catalyst (B), of this invention. The difference lies in this case in greatly reduced isobutane yield for Catalyst B.

While Catalysts B and C are catalysts of this invention, Catalyst C represents a catalyst which is preferred over Catalyst B. Catalyst C, a catalyst containing substantially no Na or Fe, is more active than Catalyst B, while exhibiting a substantial C5+ selectivity credit of about 10.0 wt. %. Catalyst C also has the higher toluene/isobutane ratio characteristics of preferred catalysts of this invention, which accounts for its improved selectivity.

Comparison of Catalysts D and E shows the same selectivity advantages, but at the higher Pt loading, indicating that the influence of the modified alumina of this invention is independent of Pt loading. The toluene/isobutane ratios of these two catalysts show the expected shift to a higher level for Catalyst E, which also has higher C5+ and toluene selectivities.

Comparative Example C

A commercial reforming catalyst comprised of 0.3 wt. % Pt, 0.3 wt. % Re, and 0.9 wt. % Cl on high purity gamma alumina was calcined in air at 500° C. for 3 hrs., reduced for 17 hrs. in hydrogen, then sulfided, all at a temperature of 500° C. This catalyst, designated Catalyst F, was tested for heptane reforming with the results presented in Table II below.

Comparative Example D to I

Various amounts of Na, Fe, Ca, and Mg were impregnated into the high purity gamma alumina prior to impregnation of 0.3 wt. % Pt, 0.3 wt. % Re, and 0.9 wt. % Cl. After impregnation of the modifier the alumina was calcined in air at 500° C. for 3 hrs. The metals and Cl were then impregnated into the modified alumina, after which it was calcined, reduced and sulfided as in Example 1 above. All of the catalysts (G-L) were tested in heptane reforming and the results are shown in Table II below.

Example 4

Catalyst M was prepared in accordance with Example 1 hereof except that 3.8 ml of Re stock solution (42 mg Re/ml) was used to incorporate 0.3 wt. % Re into the modified alumina support. This catalyst, which contained 0.3 wt. % Pt and 0.3 wt. % Re, was also tested for heptane reforming and the results shown in Table II below.

Comparative Example J

A sample of high purity reforming grade gamma alumina was impregnated with magnesium nitrate to give 420 ppm of Mg on alumina. The extrudates were calcined at 950° F. for 3 hrs., then impregnated with 5.4 ml. of chloroplatinic acid (28 mg Pt/ml) and 3.8 ml. of Re stock solution (42 mg Re/ml), and 4.8 ml of hydrochloric acid to give a catalyst comprised of 0.3 wt. % Pt, 0.3 wt. % Re, 0.9 wt. % Cl, and 420 ppm Mg on alumina. This catalyst, Catalyst N, was also tested for heptane reforming and the results given in Table II below.

Comparative Example K

Catalyst O was prepared in accordance with the procedure of Comparative Example J hereof except that 500 ppm Si was impregnated into the catalyst. This catalyst was also tested for heptane reforming and the results are shown in Table II below.

Example 5

Catalyst P was prepared by modifying a high purity gamma alumina mull mix with 500 ppm Mg and 500 ppm Si. The modified alumina was then extruded, the resulting extrudates calcined at a temperature between about 600°–700° C. after which 0.3 wt. % Pt, 0.3 wt. % Re, and 0.9 wt. % Cl were impregnated into the extrudates as in Comparative Example J above. This catalyst, which was pretreated by calcining in air for 3 hrs., reducing in hydrogen for 17 hrs., and sulfided, all at 500° C., was also tested for heptane reforming and the results shown in Table II below.

TABLE II

| | Heptane Reforming n-Heptane, 500° C., 100 psig, 10 W/H/W, H2/Oil = 6 | | | | | | | | | | |
|---|---|---|---|---|---|---|---|---|---|---|---|
| Example | C | D | E | F | G | H | I | 4 | J | K | 5 |
| Catalyst | F | G | H | I | J | K | L | M | N | O | P |
| Na, wppm | <20 | 110 | <20 | <20 | <20 | <20 | <20 | 200 | <20 | <20 | <20 |
| Fe, wppm | <20 | <50 | 670 | <50 | 830 | <50 | 870 | 480 | <50 | <50 | <50 |
| Ca, wppm | <20 | <20 | <20 | 234 | 724 | <20 | <20 | 150 | <20 | <20 | <20 |
| Mg, wppm | <20 | <20 | <20 | <20 | <20 | 330 | 360 | 146 | 420 | <20 | 500 |
| Si, wppm | <20 | <20 | <20 | <20 | <20 | <20 | <20 | 500 | <20 | 500 | 500 |
| Yield, Wt. % | | | | | | | | | | | |
| C1 | 1.4 | 1.3 | 1.2 | 1.4 | 1.1 | 1.3 | 1.1 | 1.3 | 1.4 | 1.3 | 1.4 |
| i-C4 | 3.3 | 2.6 | 2.9 | 2.5 | 2.7 | 2.3 | 2.2 | 2.3 | 2.6 | 3.4 | 2.8 |
| n-C4 | 5.5 | 5.6 | 5.0 | 5.6 | 5.0 | 5.4 | 4.6 | 5.2 | 5.6 | 5.3 | 5.3 |
| C5+ | 79.7 | 81.4 | 82.0 | 81.8 | 82.4 | 82.1 | 84.2 | 82.7 | 81.2 | 79.9 | 81.2 |
| Toluene | 31.3 | 24.3 | 25.0 | 27.7 | 24.8 | 26.9 | 22.2 | 25.9 | 27.7 | 30.0 | 28.4 |
| Conversion, % | 65.3 | 55.3 | 55.1 | 59.4 | 54.0 | 57.0 | 48.7 | 55.1 | 59.3 | 63.7 | 60.0 |
| Toluene Rate | 3.2 | 2.5 | 2.6 | 2.8 | 2.5 | 2.8 | 2.3 | 2.7 | 2.8 | 3.1 | 2.9 |
| Toluene Selectivity | 48.0 | 44.1 | 45.4 | 46.6 | 45.9 | 47.2 | 48.7 | 47.0 | 46.7 | 47.1 | 47.4 |
| Toluene/i-C4 | 9.5 | 9.4 | 8.6 | 11.1 | 9.2 | 11.7 | 10.0 | 11.3 | 10.7 | 8.8 | 10.1 |

Figure 2:
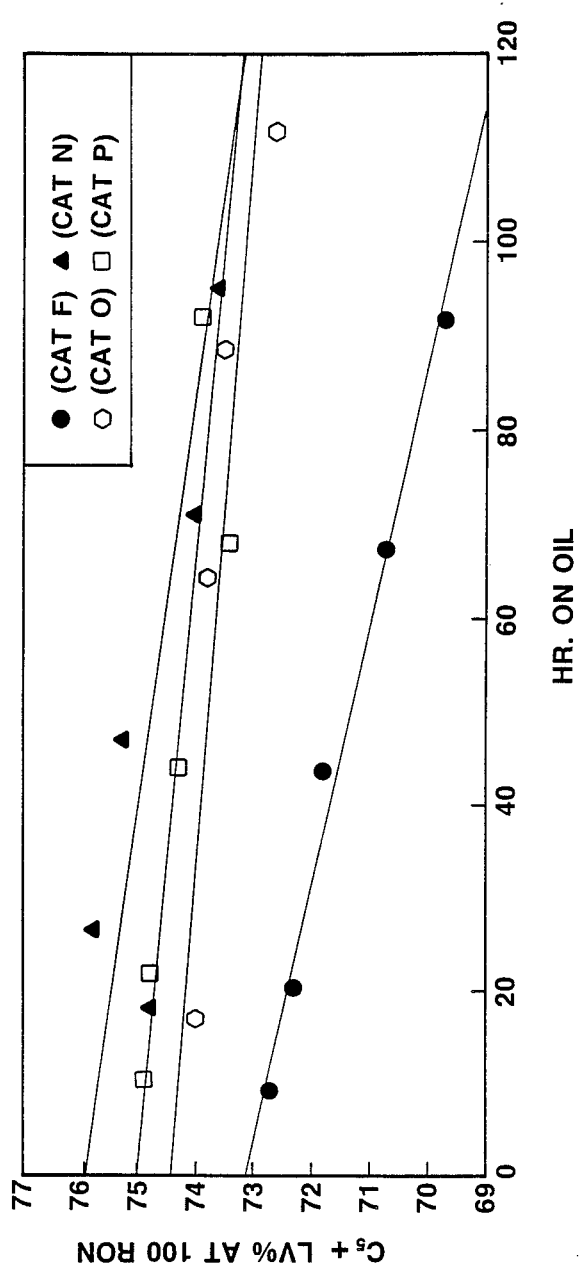
FIG. 2 is a plot of data of Table II hereof showing yield as a function of time also for Catalysts F, O, N, and P.

The data of the above table are best understood by reference to FIGS. 1 and 2 hereof exhibiting catalyst activity and stability as a function of time. Catalyst O, which contains only Si as the modifier, shows the highest activity as shown in FIG. 1. While Catalyst F, the reference commercial catalyst has comparable initial activity, it is relatively unstable, and its activity decreases with time. Catalyst N, which contains only Mg as the modifier, has a similar activity profile but being about 5 to 10% less active than Catalyst F. FIG. 2 hereof shows Catalyst N as having the highest yield and yield stability, while Catalyst O, as a consequence of its improved stability, shows a yield benefit over Catalyst F, but trails that of Catalyst N. If FIGS. 1 and 2 are considered together, one sees that only Catalyst P, which contains both Si and a Group II-A metal, affords activity, yield, and stability characteristics that are absent in the other catalysts.

The above table also illustrates the effectiveness of the modifiers of this invention versus such use of such metals as Na and Fe which are at best are relatively ineffective, though still representing catalysts of this invention.

Comparative Example L

A conventional reforming catalyst comprised of 0.3 wt. % Pt; 0.7 wt. % Re, 0.9 wt. % Cl, on high purity alumina was pretreated as in Comparative Example A above. The catalyst, designated Catalyst Q, was also used for heptane reforming and the results shown in Table III below.

Example 6

Catalyst R was prepared by impregnating 0.3 wt. % Pt and 0.7 wt. % Re into the Mg/Si modified alumina support of Example 2 hereof. This catalyst was also tested for heptane reforming and the results presented in Table III below.

TABLE III

Heptane Reforming With
0.3 Wt. % Pt-0.7 Wt. % Re Catalysts
n-Heptane, 500° C., 100 psig, 10 W/H/W, $H_2$/Oil = 6

| Catalyst | Q | R |
|---|---|---|
| Yield Wt. % | | |
| $C_1$ | 1.4 | 1.1 |
| $i-C_4$ | 6.4 | 3.8 |
| $n-C_4$ | 5.7 | 6.0 |
| $C_5+$ | 73.0 | 78.5 |
| Toluene | 28.2 | 19.2 |
| Conversion, % | 71.9 | 57.0 |
| Toluene Rate | 2.9 | 2.0 |
| Toluene Selectivity | 39.2 | 33.8 |
| Toluene/$i-C_4$ | 4.4 | 5.1 |

Catalyst R of this invention has selectivity advantages over the commercial Catalyst Q. The $C_5+$ selectivity credit arises from decreased acid cracking over Catalysts R. The toluene/$i-C_4$ ratios reflect this distinction and are higher for Catalyst R supported on the modified alumina.

Comparative Examples M

Catalyst S was prepared by pretreating a conventional reforming catalyst comprised of 0.3 wt. % Pt and 0.3 wt. % Ir on high purity gamma alumina, by calcining it in air at a temperature of 400° F. for 3 hrs., followed by reducing it in hydrogen at 500° C. for 17 hrs., followed by sulfiding at 500° C. This catalyst was tested in heptane reforming and the results are found in Table IV below.

Comparative Example N

High purity gamma alumina extrudates were impregnated with an aqueous magnesium nitrate solution to provide 210 wppm Mg. The extrudates were then calcined at about 500° C. for 3 hrs. then impregnated, as in Example 1 hereof, with a solution containing Pt and Ir to give 0.3 wt. % Pt and 0.3 wt. % Ir, based on the final weight of the catalyst. The so treated extrudates were then pretreated as in Comparative Example M above and the resulting catalyst (T) was tested in heptane reforming, the results of which are also found in Table IV below.

Example 7

500 wppm Mg and 500 wppm Si were added to a high purity gamma alumina mull mix preceding extrusion. The mix was thoroughly blended in the mull mixer then extruded. The resulting extrudates were then calcined in air at a temperature between 600° C. and 700° C., after which 0.3 wt. % Pt and 0.3 wt. % Ir were impregnated as in Example 1 hereof. The so impregnated extrudates were then pretreated as in Comparative Example M above and the resulting catalyst (U) was also tested in heptane reforming. The results are shown in Table IV below.

TABLE IV

Heptane Reforming With Modified Pt—Ir Catalysts
n-Heptane, 500° C., 100 psig, 10 W/H/W, $H_2$/Oil = 6

| Catalyst | S | T | U |
|---|---|---|---|
| Na, wppm | <20 | <20 | <20 |
| Ca, wppm | <20 | <20 | <20 |
| Mg, wppm | <20 | 210 | 500 |
| Fe, wppm | <20 | <20 | <20 |
| Si, wppm | <20 | <20 | 500 |
| Yield, Wt. % | | | |
| $C_1$ | 1.8 | 1.9 | 1.7 |
| $i-C_4$ | 2.8 | 1.5 | 1.8 |
| $n-C_4$ | 5.0 | 5.3 | 4.7 |
| $C_5+$ | 80.4 | 82.4 | 83.5 |
| Toluene | 29.0 | 25.7 | 24.9 |
| Conversion, % | 62.3 | 56.7 | 54.3 |
| Toluene Rate | 6.0 | 5.3 | 5.1 |
| Toluene Selectivity | 62.3 | 56.7 | 45.9 |
| Toluene/$i-C_4$ | 10.4 | 17.1 | 13.9 |

Comparative Example O

Comparative Example M was repeated except the catalyst contained 0.6 wt. % Pt-0.6 wt. % Ir on high purity alumina. The resulting catalyst (V) was tested in heptane reforming and the results are shown in Table V below.

Comparative Example P

Comparative Example N was followed except the catalyst contained 0.6 wt. % Pt, 0.6 wt. % Ir, and 350 wppm Mg on high purity gamma alumina. The resulting catalyst (W) was also tested in heptane reforming with the results are shown in Table V below.

Example 8

Example 7 hereof was followed except the catalyst was comprised of 0.6 wt. % Pt, 0.6 wt. % Ir, 500 wppm Mg, and 500 wppm Si on alumina. This catalyst (X) was also tested in heptane reforming and the results are shown in Table V below.

TABLE V

Heptane Reforming With Modified Pt—Ir Catalysts
n-Heptane, 500° C., 100 psig, 10 W/H/W, $H_2$/Oil = 6

| Catalyst | V | W | X |
|---|---|---|---|
| Na, wppm | <20 | <20 | <20 |
| Ca, wppm | <20 | <20 | <20 |
| Mg, wppm | <20 | 350 | 500 |
| Fe, wppm | <20 | <20 | <20 |
| Si, wppm | <50 | <50 | 500 |
| Yield, Wt. % | | | |
| $C_1$ | 2.4 | 2.4 | 2.0 |
| $i-C_4$ | 2.9 | 2.0 | 2.1 |
| $n-C_4$ | 6.4 | 6.1 | 5.6 |
| $C_5+$ | 75.9 | 78.7 | 80.7 |
| Toluene | 30.8 | 31.2 | 30.2 |
| Conversion, % | 70.0 | 67.8 | 63.8 |
| Toluene Rate | 6.3 | 6.4 | 6.2 |
| Toluene Selectivity | 44.3 | 45.7 | 47.4 |
| Toluene/$i-C_4$ | 10.6 | 15.6 | 14.4 |

Comparative Example O

The procedure of Example 1 hereof was followed to prepare a trimetallic catalyst (Y) comprised of 0.3 wt. % Pt, 0.3 wt. % Ir, and 0.3 wt. % Re on high purity gamma alumina. The catalyst was pretreated as in Comparative Example N hereof and tested in heptane reforming. The results are shown in Table VI below.

Example 9

The procedure of Example 1 was followed except the alumina contained 200 wppm Na, 150 wppm Ca, 146 wppm Mg, 480 wppm Fe, and 500 wppm Si, as well as 0.3 wt. % Pt, 0.3 wt. % Ir, and 0.3 wt. % Re. The catalyst (Z) was also tested in heptane reforming and the results are shown in Table VI below.

TABLE VI

Heptane Reforming With Modified Pt—Ir Catalysts
n-Heptane, 500° C., 100 psig, 10 W/H/W H$_2$/Oil = 6

| Catalyst | Y | Z |
|---|---|---|
| Na, wppm | <20 | 200 |
| Ca, wppm | <20 | 150 |
| Mg, wppm | <20 | 146 |
| Fe, wppm | <20 | 480 |
| Si, wppm | <50 | 500 |
| Yield, Wt. % | | |
| C$_1$ | 1.6 | 1.2 |
| i-C$_4$ | 2.9 | 1.5 |
| n-C$_4$ | 5.3 | 3.8 |
| C$_5$+ | 80.1 | 86.9 |
| Toluene | 31.6 | 22.9 |
| Conversion, % | 64.6 | 46.4 |
| Toluene Rate: | 6.5 | 4.7 |
| Toluene Selectivity | 48.9 | 49.4 |
| Toluene/i-C$_4$ | 10.9 | 15.3 |

Comparative Example R

An agglomerated Pt-Ir catalyst (AA) was prepared by following the procedure of Example 1 hereof using high purity gamma alumina. The impregnation mixture contained 8.9 ml. of Pt stock solution and 3.1 ml of Ir stock solution, to give a 0.5 wt. % Pt-0.1 wt. % Ir content. After being air and vacuum dried, the catalyst was calcined in air at 500° C. for 3 hrs. to agglomerate the Ir. The catalyst was then reduced at about 500° C. for 17 hours then sulfided at the same temperature. The resulting catalyst was then tested in heptane reforming, the results of which are found in Table VII below.

Example 10

The procedure of Comparative Example R was followed except the alumina was a modified alumina as in Example 1 hereof. The resulting catalyst (AB) was tested for heptane reforming and the results are found in Table VII below.

TABLE VII

Heptane Reforming with Agglomerated Pt—Ir Catalysts
n-Heptane, 500° C., 100 psig, 20 W/H/W, H$_2$/Oil = 6

| Catalyst | AA | AB |
|---|---|---|
| Na, wppm | <20 | 200 |
| Ca, wppm | <20 | 150 |
| Mg, wppm | <20 | 146 |
| Fe, wppm | <20 | 480 |
| Si, wppm | <20 | 500 |
| Yield, Wt. % | | |
| C1 | 1.6 | 0.9 |
| i-C$_4$ | 2.8 | 1.4 |
| n-C$_4$ | 4.6 | 3.6 |
| C$_5$+ | 82.0 | 88.8 |
| Toluene | 30.5 | 21.4 |
| Conversion, % | 61.7 | 41.1 |
| Toluene Rate | 6.2 | 4.4 |
| Toluene Selectivity | 49.0 | 51.8 |
| Toluene/i-C$_4$ | 10.9 | 15.3 |

Table VII illustrates that agglomerated Pt-Ir catalysts exhibit the same response to the alumina supports of this invention as the Pt-Re and Pt-Ir series. That is, the C$_5$+ selectivity is improved, and the toluene/isobutane ratio increases for the catalyst of this invention, Catalyst AB.

Comparative Example S

A 0.5 wt. % Pt-0.3 wt. % Re-0.1 wt. % Ir Catalyst (AC), was prepared in accordance with the procedure of Example 1 hereof except that high purity gamma alumina was used. After being dried, the catalyst was calcined in air at 500° C. for 3 hrs. to agglomerate the Ir. It was then reduced in a hydrogen containing atmosphere at a temperature of about 500° C. for 17 hours, then sulfided at the same temperature. The results of the heptane reforming are found in Table VIII below.

Example 11

Catalyst AD was prepared in accordance with procedure of Comparative Example S except the alumina was the modified alumina of Example 1 hereof. The results of heptane reforming are found in Table VIII below.

TABLE VIII

Heptane Reforming with Agglomerated Ir—Pt—Re Catalysts
n-Heptane, 500° C., 100 psig, 20 W/H/W, H$_2$/Oil = 6

| Catalyst | AC | AD |
|---|---|---|
| Na, wppm | <20 | 200 |
| Ca, wppm | <20 | 150 |
| Mg, wppm | <20 | 146 |
| Fe, wppm | <20 | 480 |
| Si, wppm | <50 | 500 |
| Yield, Wt. % | | |
| C1 | 1.3 | 1.1 |
| i-C$_4$ | 2.0 | 1.2 |
| n-C$_4$ | 4.8 | 4.4 |
| C$_5$+ | 83.4 | 86.6 |
| Toluene | 27.8 | 23.1 |
| Conversion, % | 55.7 | 46.2 |
| Toluene Rate | 5.7 | 4.7 |
| Toluene Selectivity | 49.9 | 49.9 |
| Toluene/i-C$_4$ | 13.9 | 19.3 |

Table VIII illustrates that the agglomerated trimetallic supported on the alumina of this invention has a higher C$_5$+ selectivity and toluene/isobutane ratio than its counterpart supported on conventional alumina.

Comparative Example T

Catalyst AE was prepared by incorporating 0.3 wt. % Sn in a mull mix of high purity alumina. The mull mix was then extruded, the extrudates dried, then impregnated with 0.6 wt. % Pt and 0.6 wt. % Ir by using a mixture containing 10.8 ml of Pt stock solution and 17.6 ml of Ir stock solution, and 5 ml of chloride stock solution. The resulting catalyst was calcined at about 400° C. for 3 hrs., reduced at about 500° C. for 17 hrs., then sulfided at about 500° C. This catalyst was also tested in heptane reforming and the results are found in Table IX below.

Example 12

The above procedure was followed except instead of high purity alumina, the alumina contained about 200 wppm Na, 150 wppm Ca, 146 wppm Mg, 480 wppm Fe, and 500 wppm Si. The catalyst (AF) was also tested in heptane reforming and the results are found in Table IX below.

Comparative Example U

The procedure of Comparative Example T was followed except the resulting catalyst was comprised of 0.3 wt. % Pt-0.1 wt. % Ir-0.1 wt. % Sn on high purity gamma alumina. The catalyst (AG) was calcined at 500° C. for 3 hrs. to agglomerate the Ir prior to reduction and sulfiding. The heptane reforming date is also found in Table IX below.

Example 13

Catalyst AH was prepared by the procedure of Comparative Example T except the alumina was the modified alumina of Example 1 hereof and the catalyst contained 0.3 wt. % Pt-0.1 wt. % Ir-0.1 wt. % Sn. The heptane reforming data is found in Table IX below.

TABLE IX

Heptane Reforming With Pt—Ir—Sn Catalysts
n-Heptane, 500° C., 100 psig, 20 W/H/W, H2/Oil = 6

| Catalyst | AE | AF | AG | AH |
|---|---|---|---|---|
| Na, wppm | <20 | 200 | <20 | 200 |
| Ca, wppm | <20 | 150 | <20 | 150 |
| Mg, wppm | <20 | 146 | <20 | 146 |
| Fe, wppm | <20 | 480 | <20 | 480 |
| Si, wppm | <50 | 500 | <50 | 500 |
| Yield, Wt. % | | | | |
| $C_1$ | 1.6 | 1.2 | 0.8 | 0.7 |
| i-$C_4$ | 3.2 | 1.5 | 2.5 | 1.9 |
| n-$C_4$ | 5.3 | 4.1 | 3.5 | 3.1 |
| $C_5+$ | 79.4 | 86.2 | 85.7 | 87.5 |
| Toluene | 31.3 | 21.7 | 22.1 | 20.3 |
| Conversion, % | 66.1 | 45.8 | 46.1 | 41.4 |
|  | 6.4 | 4.5 | 4.5 | 4.2 |
| Toluene Rate | 47.4 | 47.6 | 47.9 | 49.0 |
| Toluene Selectivity | 9.8 | 14.5 | 8.8 | 10.7 |
| Toluene/i-C4 | | | | |

Various samples of the above catalysts were used to reform a Light Arab paraffinic naphtha at high severity cyclic conditions of 500° C., 140 psig, 2200 SCF/B, 1.9 W/H/W. The results are shown in Table X below.

TABLE X

Cyclic Reforming of Low Sulfur Light Arab Paraffinic Naphtha

| Catalyst | Activity | $C_5+$ LV % at 100 RON | Decrease in $C_3/C_4$ Wt. % (a) |
|---|---|---|---|
| F | 74 | 71.8 | — |
| N | 77 | 75.0 | 3.1 |
| P | 90 | 74.0 | 2.2 |
| AG | 117 | 75.8 | — |
| AH | 100 | 76.5 | 1.8 |
| Y | 118 | 76.5 | — |
| Z | 121 | 78.5 | 1.4 |

(a) Decrease relative to same catalyst on conventional reforming alumina.

The above table illustrates that the catalysts of the present invention, P, AH, and Z, have a substantially increased activity or increased liquid yield over the reference catalysts.

What is claimed is:

1. In a process for reforming, in the presence of hydrogen, a naphtha feed at reforming conditions, the improvement which comprises reacting said feed with a catalyst composition comprised of: 0.01 to 2 wt. % platinum; 0.01 to 2 wt. % tin; alumina; and a modifier comprised of at least about 100 wppm Si and at least about 10 wppm of one or more alkaline earth metals selected from the group consisting of Ca, Mg, Ba, and Sr, wherein the total amount of modifier does not exceed about 5000 wppm.

2. The process of claim 1 wherein about 0.1 to 0.7 wt. % platinum, 0.1 to 0.7 wt. % tin are present and the modifier is comprised of about 100 to 200 wppm Si and about 100 to 3000 wppm of an alkaline earth metal selected from Ca and Mg.

3. The process of claim 2 wherein about 0.1 to 0.7 wt. % platinum and 0.1 to 0.7 wt. % tin are present; the modifier is comprised of about 100 to 200 wppm Si and about 200 to 1000 wppm of an alkaline earth metal selected from Ca and Mg; and the alumina is gamma alumina.

4. The process of claim 1 wherein about 0.1 to 3.5 wt. % halogen is also present.

5. The process of claim 4 wherein about 0.5 to 1.5 wt. % halogen is also present, the concentration of both platinum and tin are each about 0.1 to 0.7 wt. %, and the modifier is comprised of about 100 to 200 wppm Si and about 100 to 3000 wppm of an alkaline earth metal selected from Ca and Mg.

6. The process of claim 1 wherein up to 2 wt. % of a iridium, rhenium, or both is also present.

7. The process of claim 3 wherein about 0.1 to 0.7 wt. % of iridium, rhenium, or both, are present.

8. The process of claim 5 wherein about 0.1 to 0.7 wt. % of a metal selected from Ir and Re is also present.

* * * * *